US005405633A

United States Patent [19]

Heidlas et al.

[11] Patent Number: 5,405,633

[45] Date of Patent: Apr. 11, 1995

[54] PROCESS FOR THE EXTRACTION OF FATS AND OILS

[75] Inventors: Jürgen Heidlas, Trostberg; Jan Cully, Garching; Heinz-Rüdiger Vollbrecht, Altenmarkt, all of Germany

[73] Assignee: SKW Trostberg Aktiengesellschaft, Trostberg, Germany

[21] Appl. No.: 131,296

[22] Filed: Oct. 4, 1993

[30] Foreign Application Priority Data

Oct. 8, 1992 [DE] Germany ........................ 42 33 911.1
Aug. 6, 1993 [DE] Germany ........................ 43 26 399.2

[51] Int. Cl.$^{6}$ ................................................ A23D 9/02

[52] U.S. Cl. .................................... 426/442; 426/475; 426/492; 426/417; 554/8; 554/9

[58] Field of Search ............... 426/474, 475, 486, 489, 426/442, 443, 492, 495, 417; 554/8, 9

[56] References Cited

U.S. PATENT DOCUMENTS

| | | |
|---|---|---|
| 1,802,533 | 4/1931 | Reid . |
| 3,892,789 | 7/1975 | Parsons . |
| 3,939,281 | 2/1976 | Schwengers . |
| 4,554,163 | 11/1985 | Weber . |
| 4,675,133 | 6/1987 | Eggers . |
| 4,744,926 | 5/1988 | Rice . |
| 4,749,522 | 6/1988 | Kamarei . |
| 4,981,579 | 1/1991 | Paspek . |
| 5,041,245 | 8/1991 | Benado . |
| 5,169,968 | 12/1992 | Rice . |
| 5,170,727 | 12/1992 | Nielsen . |
| 5,210,240 | 5/1993 | Peter . |
| 5,281,732 | 1/1994 | Franke . |
| 5,290,959 | 3/1994 | Rice . |

FOREIGN PATENT DOCUMENTS

| | | |
|---|---|---|
| 1069629 | of 0000 | Germany . |
| 3228927 | of 0000 | Germany . |

OTHER PUBLICATIONS

Journal of the American Oil Chemists' Society, vol. 27, No. 1, pp. 11-14, 1950.

Patent Abstracts of Japan, vol. 13, No. 255, 12 Jun. 1989 abstracting Japanese Patent 01 056793 of Mar. 3, 1989.

*Primary Examiner*—Carolyn Paden
*Attorney, Agent, or Firm*—Felfe & Lynch

[57] ABSTRACT

A process for the extraction of fats and oils from natural substances using liquid propane as the solvent is described in which the extraction is carried out at a pressure of 10 to 30 bar and a temperature of 10° to 55° C. and the separation of the extracted fats and oils from the solvent is carried out by means of pressure reduction or/and temperature increase to ≦80° C. High quality products are isolated in this way in a good yield and under mild conditions.

8 Claims, No Drawings

PROCESS FOR THE EXTRACTION OF FATS AND OILS

FIELD OF THE INVENTION

The present invention concerns a process for the extraction of fats and oils from natural products such as e.g. plant, animal or microbial starting materials with the aid of liquid propane as the solvent wherein this process can be used for the isolation of fats and oils as well as for the production of defatted or deoiled products which are becoming of increasing importance as low-fat and thus low-calorie products in the food sector.

BACKGROUND OF THE INVENTION

There are basically two processes available for defatting and deoiling for example plant products: extraction and pressing. From an economic point of view pressing is only advantageous when the fat and oil content of the starting material is relatively high (>25% by weight). However, even when this process is utilized optimally, a residual fat content of at least 4 to 5% by weight remains in the processsed residue. In contrast, extractive processes with normal organic solvents such as e.g. hexane or light petroleum are more suitable for starting products with a low fat content whereby the residual content in the residue can usually be reduced to under 1% by weight. A disadvantage of conventional solvent extraction is the fact that most solvents are not toxicologically harmless and that the extracted fats and oils as well as the extraction residues have to be substantially free of solvent before they can be used for foods or fodder. Comparatively high temperatures are necessary for this which can have a negative influence on the sensory properties of the products.

Separating has the greatest technical importance for defatting animal starting material such as e.g. fatty meat. After a thermal or mechanical disintegration of the educt, the difference in the density of the meat and fat components is usually utilized in this process in order to carry out a separation in separators or decanters. Using this process it is not possible for economic reasons to produce products from fatty meat that has a fat content of less than 10% since the losses of meat are too high. Therefore in order to produce meat products with a lower fat content it is necessary to use extractive processes which have the aforementioned disadvantages when organic solvents are used.

In order to circumvent this problem, extraction with compressed gases has been used in recent years in particular for the isolation of sensitive natural products whereby carbon dioxide ($CO_2$) in particular has generally been accepted as the extraction medium in the technical field. The extraction of fats and oils with supercritical $CO_2$ is only satisfactory in very high pressure ranges (>500 bar) because of its low solubilizing power and this is technically complicated and consequently very cost-intensive and thus only comes into consideration for products for which there is a very high creation of value. This disadvantage can only be partially compensated by adding entraining agents to the $CO_2$ and the additional expenditure for controlling the dosage of the entraining agent may be regarded as a further disadvantage.

Apart from $CO_2$, compressed propane has also already been recommended as a solvent for the extraction of fats and oils. Thus according to DE-OS 28 43 920 crude vegetable fats and oils are refined with supercritical gases such as propane and $CO_2$ while in other publications (U.S. Pat. No. 4,331,695=DE-OS 23 63 418, U.S. Pat. No. 3,939,281, DE-OS 22 55 567, DE-OS 22 55 566) an extraction pressure near to or above the critical pressure and subcritical extraction temperatures are recommended. The critical conditions for propane are ≧42 bar and ≧97° C. Liquid propane is disclosed according to U.S. Pat. No. 2,560,935 and U.S. Pat. No. 2,682,551 as a solvent for oils and fats but no specific details are given with respect to the extraction pressure. Finally according to U.S. Pat. No. 2,254,245 a fat extraction is described at very low temperatures (<0° C.) whereas according to U.S. Pat. No. 1,802,533 a maximal extraction pressure of 7 bar is recommended. In addition critical state parameters were often selected for the separation of the extracted lipids in which a phase separation into a propane phase which is rich in oil and one which is poor in oil is utilized in this range of conditions in order to separate the oil or to fractionate it (cf. for example U.S. Pat. No. 2,660,590 or U.S. Pat. No. 2,548,434).

These known processes all have disadvantages: on the one hand extraction yields are obtained under critical and supercritical state conditions in which the quality of the extracted oil or fat is substantially reduced by high thermal stress. On the other hand although extraction with liquid propane is selective in pressure regions of <10 bar, mass transfer is, however, limited during the extraction and therefore longer extraction periods and larger amounts of extracting agents are necessary in order to achieve the extraction goal for defatting and deoiling.

OBJECTS OF THE INVENTION

The object of the present invention was therefore to develop a process for the extraction of fats and oils from natural products with the aid of propane as the solvent which does not have the said disadvantages of the state of the art and which enables an adequate charging of the gas with fats and oils as well as a good sensory quality of the products without being technically complicated.

DESCRIPTION OF THE INVENTION

This object was achieved according to the present invention by carrying out the extraction at a pressure of 10 to 30 bar and a temperature of 10° to 55° C. and separating the extracted fats and oils from the solvent by reducing the pressure or/and increasing the temperature to ≦80° C. It surprisingly turned out that the conditions for the extraction of fats and oils with liquid propane are optimal in this relatively narrow range of pressure and temperature because not only good extraction yields but also extracts of a high quality are obtained which contain no or only slight amounts of undesired accompanying substances. The reason that this is so surprising is that one concedes compressed gases in a liquid (subcritical) state to have inter alia extraction properties which are less favourable than for example gases in a critical or supercritical state. Moreover this obviates an unnecessarily high extraction pressure (>30 bar) by which means the capital expense and operating costs can be substantially reduced.

In principle all natural products containing fats or oils derived from plants, animals or microbes can be used for the process according to the present invention. Examples of vegetable fats or oils are olive oil, palm oil, bamboo fat, coconut fat, cocoa butter, coffee oils, peanut butter, rape oil (rape-seed oil), flax oil (linum oil), sunflower oil, wheat germ oil, rice germ oil, cottonseed oil, maize germ oil, soybean oil, palm kernel oil as well as pumpkin seed oil. Beef or veal as well as oils from marine animals such as e.g. fish oils come into consideration as animal products. Finally the process according to the present invention can also be used for fermentation residues, for example from yeasts, fungi or bacteria.

In order to increase the extraction yield it is advisable to use the extraction material in a comminuted, pelleted form. If the starting material (especially when solid) has a high water content, such as e.g. meat or fermentation residues, then it has proven to be particularly advantageous to reduce the moisture content before the extraction to under 50% by suitable drying methods.

An essential feature of the invention is that the extraction with liquid propane is carried out in a very narrow and defined pressure and temperature range which is 10 to 30 bar and 10° to 55° C. The process is preferably carried out at an extraction pressure of 15 to 25 bar and an extraction temperature of 20° to 45° C. In any case the extraction pressure and temperature must be matched in such a way that the propane is present in a liquid state.

At pressures of >30 bar the extraction properties of liquid propane become increasingly unselective in particular when extracting oil seeds i.e. undesired dyes and unsaponifiable components are also extracted which greatly reduces the quality of the extracted oil. With increasing extraction temperatures (near or above $T_K$) there is also a risk that, in particular for oils with a high content of polyunsaturated fatty acids, on the one hand undesired reactions in the complex natural product matrix of the starting material occur (and thus the extraction yield is lowered) and on the other hand undesired isomerizations are observed at the double bonds of the polyunsaturated fatty acids (formation of cis, trans-configurated double bonds) which have a detrimental influence on the nutritional physiological value of the product.

The amount of propane gas used can be varied over wide ranges and essentially depends on the amount of the oil or fat to be extracted. Usually, depending on the type of starting material, 2.5 to 500 g liquid propane is necessary per g of fat or oil to be extracted. The maximum content of lipid substances in the gas is 5 to 25% by weight under these extraction conditions depending on the type of extracted fat or oil.

The purity of the propane gas used is relatively uncritical in most cases i.e. considerable amounts of contamination by homologous hydrocarbons (due to the refining process) can also be present without this leading to significant losses in quality. Propane is preferably used in a technical purity of ca. 90% and in a deodorized form. The extraction with liquid propane can in some cases also be carried out in two or several stages for the complete isolation of the fats or oils.

The propane gas is preferably recycled in order that it can be charged several times with the desired lipid substances but it is also possible to contact the extraction material only once with the extraction medium. In order to obtain a high economic efficiency of the process, several extraction autoclaves can be connected in series and the extraction medium can be passed through these in series. By connecting these autoclaves in a suitable sequence (e.g. flow according to progress in the degree of extraction) it is possible to always optimally utilize the maximum achievable gas charging of the liquid propane.

Subsequent to the extraction, fats and oils dissolved in the liquid propane are separated by a reduction in pressure or/and increase in temperature whereby a pressure reduction and temperature increase to ≦80° C. has proven to be particularly advantageous. By this means it can be ensured that no undesired reactions, such as e.g. isomerization of double bonds of polyunsaturated fatty acids, occur during the separation. According to a preferred embodiment the separation is carried out by an isobaric evaporation of the solvent which decisively increases the economic efficiency of the process.

High quality products can be obtained using the process according to the present invention with regard to colour, odour and taste in a good yield and using mild conditions. Due to the comparatively low technical complexity, this process is also well suited to application on a technical scale.

The following examples are intended to further elucidate the invention.

Examples

Example 1

200 g cocoa which had previously been defatted (granulate size 1 to 2 mm, fat content ca. 11%) was extracted in a pressure autoclave at 20 bar and 25° C. with compressed propane that flows off. After 1 kg propane had been passed through, no further cocoa butter was separated during continuous expansion of the gas to atmospheric pressure. The residual fat content in the granulate was <0 3% the yield of extracted cocoa butter was 2.2 g.

Example 2

140 g ground flax seed (oil content ca. 41%) was extracted in a pressure autoclave at 20 bar and 25° C. with compressed propane that flows off. After 0.7 kg propane had been passed through, 50 g oil was extracted (corresponds to 87% defatting). After a second grinding of the residue (fat content ca. 8%) it was extracted under the same conditions with a further 0.15 kg propane in which an almost complete deoiling of the residue was achieved. The oil was separated in both stages by continuous expansion of the gas to atmospheric pressure. A residual oil content in the residue could not be determined by Soxhlet extraction with hexane (8 h), the yield of oil was 57.5 g.

Example 3

1 kg pretreated soya flakes (oil content ca. 18%) was extracted with compressed propane in a pressure autoclave at 30 bar and 45° C. The extraction agent was recycled continuously during which the oil was separated by isobaric evaporation of the propane at 80° C. in a separator before the non-charged propane (cooled to 45° C.) again flowed through the extraction material. The extraction was ended after a total amount of 7 kg propane had passed through the soya flakes. The residual oil content of the residue was less than 1%, the yield of oil was 175 g.

Example 4

350 g meat pellets which had been previously mechanically defatted and adjusted to a water content of ca. 20% by means of freeze-drying (size 0.5 to 1.5 cm, fat content 25% in the dry mass) were extracted with 1.75 kg compressed propane in a pressure autoclave at 25 bar and 40° C. The fat separation was carried out isobarically in the circulation process (analogous to example 3) by increasing the temperature to 75° C. The fat content in the extraction residue was determined by means of Soxhlet (8 h with hexane) as 3% fat in the dry mass; 65 g fat were collected in the separator.

We claim:

1. The method of extracting fats and oils from natural products with the aid of liquid propane as the solvent, which comprises contacting said natural products with liquid propane at a pressure of 10 to 30 bar and a temperature of 10°–55° C. within a confined space of constant volume, and separating the extracted fats and oils from the solvent by lowering the pressure or increasing the temperature to ≦80° C., within said space whereby a high quality oil which contains no or only slight amounts of undesired accompanying substances is obtained.

2. The method of claim 1, wherein the extraction of the fats and oils is performed at a pressure of 15–25 bar and a temperature of 20°–45° C.

3. The method of claim 1, wherein the separation of the extracted fats and oils from the solvent is performed by isobaric evaporation of the solvent.

4. The method of claim 1, wherein the fat-or-oil containing starting material is provided in granulated or pelleted form.

5. The method claim 1, wherein the amount of liquid propane used for the extraction is 2.5 to 500 g per gram of fat or oil to be extracted.

6. The method of claim 1, wherein the content of fats and oils in the propane after the extraction is 5–25% by weight.

7. The method of claim 1, wherein the liquid propane solvent is used in technically pure and deodorized form.

8. The method of claim 1, wherein the extraction is performed in a plurality of series-connected extraction autoclaves.

* * * * *